United States Patent

Sorice et al.

[11] 3,887,975
[45] June 10, 1975

[54] SLOTTING CUTTER AND CUTTING INSERT THEREFOR

[75] Inventors: Edward L. Sorice, Crabtree; Ernest J. Friedline, Latrobe, both of Pa.

[73] Assignee: Kennametal Inc., Latrobe, Pa.

[22] Filed: May 13, 1974

[21] Appl. No.: 469,516

[52] U.S. Cl. ............................. 29/105 R; 29/95 R
[51] Int. Cl. .................................................. B26d 1/12
[58] Field of Search ..................... 29/105 R, 105 A; 83/839–844

[56] References Cited
UNITED STATES PATENTS

| | | | |
|---|---|---|---|
| 1,700,333 | 1/1929 | Pond | 29/105 R |
| 1,964,786 | 7/1934 | McLean | 29/105 R |
| 3,104,453 | 9/1963 | Greenleaf | 29/105 R |
| 3,323,192 | 6/1967 | Gustafson | 29/105 R |
| 3,757,397 | 9/1973 | Lindsay | 29/105 R |

*Primary Examiner*—Leonidas Vlachos
*Attorney, Agent, or Firm*—Melvin A. Crosby

[57] ABSTRACT

A slotting cutter in which a disc is provided with insert pockets on opposite sides thereof with replaceable cutting inserts of hard wear resistant material mounted in the pockets. The inserts are clamped in the pockets by an eccentric which forces the inserts against the rearward and bottom walls of the pockets thereby providing extremely firm support for the inserts. When the disc is viewed in the circumferential direction, the inserts are in overlapping relation and thereby cooperate to cut slots in a work member.

7 Claims, 10 Drawing Figures

SLOTTING CUTTER AND CUTTING INSERT THEREFOR

The present invention relates to slotting cutters and is particularly concerned with a slotting cutter of novel design which can be formed to cut relatively narrow as well as relatively wide slots.

Slotting cutters are known for cutting keyways and the like and, also, for providing work members with slots of various width.

Slotting cutters of the nature referred to are somewhat similar to milling cutters in that the cutter usually employs a disc-like member having cutting inserts mounted in the periphery thereof. In a milling cutter, the cutting inserts are generally presented axially whereas, in a slotting cutter, the cutting inserts protrude radially from the supporting disc and are, thus, presented to the work in the radial direction.

In order to form slots rapidly and efficiently, it is essential that the cutting inserts be solidly supported in the support disc. With the inserts solidly supported, the slotting cutter is able to withstand substantial loads and can cut extremely rapidly and accurately.

BRIEF SUMMARY OF THE INVENTION

According to the present invention, a slotting cutter is formed by forming pockets in the sides of a supporting disc at the periphery thereof in circumferentially distributed relation with some of the pockets being formed in one side of the disc and others being formed in the opposite side of the disc. Cutting inserts are mounted in the pockets and protrude radially therefrom and eccentrics carried by the disc are operable for clamping the inserts firmly in the pockets in load transmitting relation to the trailing and radially inward walls of the pockets.

Each pocket extends only part-way through the support disc in the axial direction and, thus, has only two open sides so that an insert disposed in a pocket is extremely solidly supported therein and on the trailing side bears directly on the material of the support disc whereby the support for the insert is extremely solid and capable of sustaining relatively high loads.

With the foregoing in mind, a primary object of the present invention is the provision of a slotting cutter of improved design.

Another object is the provision of a cutting insert for detachably mounting in the slotting cutter and especially adapted for use therewith.

The exact nature of the present invention will become more apparent upon reference to the following detailed specification taken in connection with the accompanying drawings in which.

Figure 3:
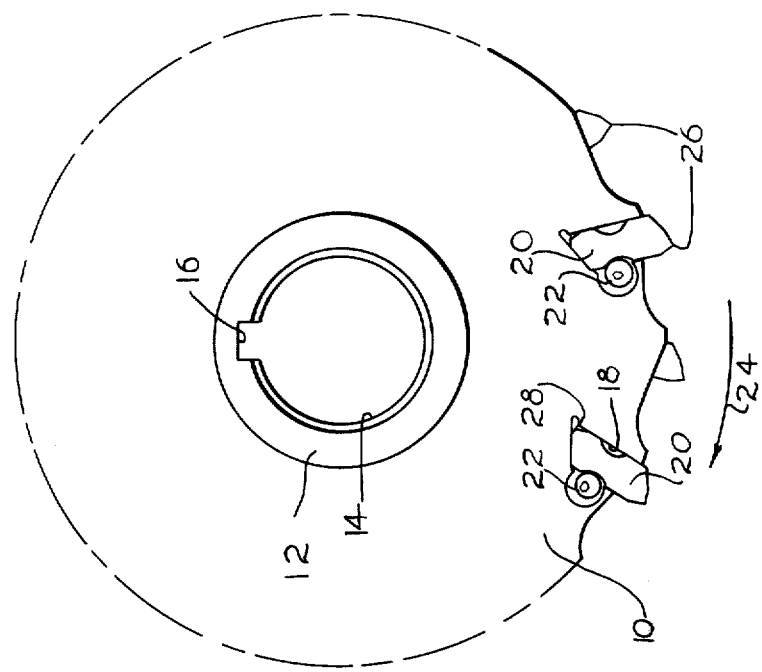
FIG. 3 is a view looking in at the side of the slotting cutter opposite the FIG. 1 side thereof.

DETAILED DESCRIPTION OF THE INVENTION:

Referring to the drawings somewhat more in detail, the slotting cutter according to the present invention comprises a support disc 10 having a central hub region 12 which is provided with a bore 14 for receiving a support shaft and with a keyway 16 for receiving a drive key. Slotting cutter 10 is provided with a plurality of cutting insert receiving pockets 18 on each axial face of the insert.

The pockets are distributed circumferentially about each face of the insert, and the pockets in one face of the insert are staggered relative to the pockets in the other face of the insert. The staggering of the pockets will plainly be seen in FIGS. 1 and 3. Replaceably mounted in each pocket is a cutting insert 20 fixed in place by an eccentric 22.

Figure 2:
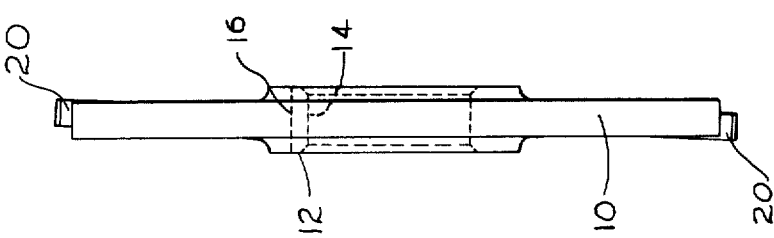
FIG. 2 is a view looking in at the edge of a slotting cutter of FIG. 1.
Figure 1:
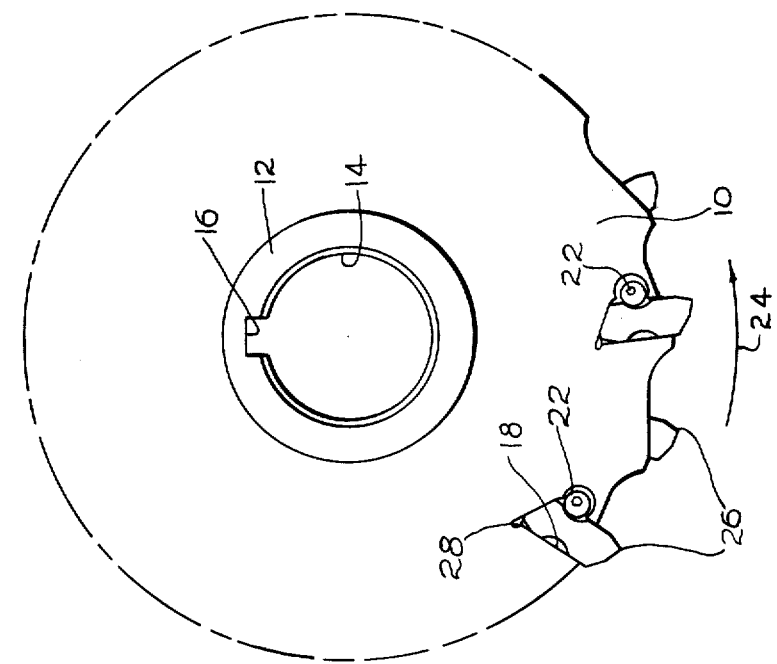
FIG. 1 is a view looking in at one side of a slotting cutter according to the present invention.

The slotting cutter of FIGS. 1 to 3 rotates in the direction of the arrow 24 and each of the cutting inserts 20 is provided with a cutting edge 26 on the leading side of the radially outer end and the cutting edge 28 on the trailing side of the radially inner end. Each insert, thus, has two cutting edges and these cutting edges can be selectively presented to working position by loosening an insert and indexing the insert about an axial axis and then again clamping the insert in the support disc.

Figure 4:
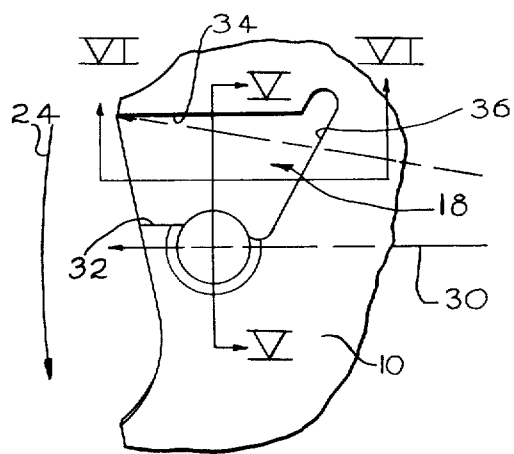
FIG. 4 is a side view of a portion of the support disc of the slotting cutter drawn at enlarged scale and showing more or less in detail the configuration of an insert receiving pocket therein.
Figure 5:
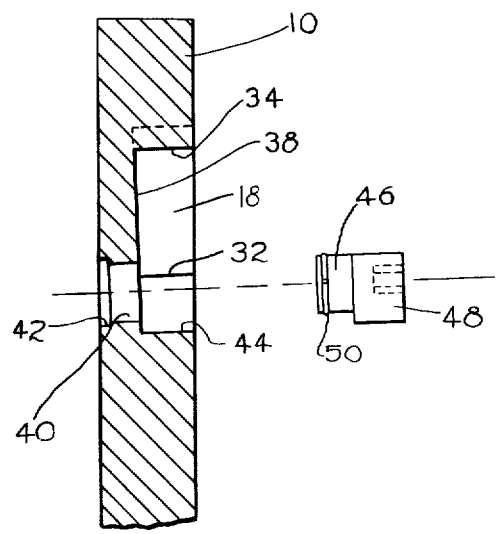
FIG. 5 is a sectional view indicated by line V—V on FIG. 4.
Figure 6:
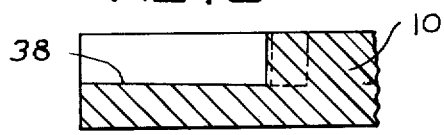
FIG. 6 is a sectional view indicated by line VI—VI on FIG. 4.

Turning to FIGS. 4 to 6, each pocket 18 will be seen to comprise fore and aft parallel walls which are parallel to a radius on the leading side thereof. For example, in FIG. 4, a radius of the support disc 10 is indicated at 30 and the forward and rearward walls of the pocket 18 illustrated therein are indicated at 32 and 34 respectively.

The radially inner wall of pocket 18, indicated at 36, is inclined at an angle to front and rear side walls 32 and 34 so as to converge with radius 30 in the radially outward direction. The direction of rotation of the support disc in FIG. 4 is again indicated by arrow 24.

Turning to FIG. 5, it will be noted that pocket 18 has an axially bottom wall 38 extending between forward and rearward walls 32 and 34 and perpendicular thereto. It will, also, be noted in FIG. 5 that the pocket 18 is formed into support disc 10 so that the axially bottom wall 38 thereof diverges from the central plane of disc 10 in the rearward direction, namely, so that the leading radial corner of the insert on the axially outer side is spaced farther outwardly from the disc than the trailing radial corner on the axially outer side.

In this manner, side clearance is provided for the insert. It will be understood that the pockets on opposite sides of the disc are inclined in respect of the opposite direction so that the radial corner of each insert on the axially outer side is outermost with respect to the support disc 10.

Reference to FIG. 6 will, furthermore, show that the axially bottom wall 38 of each pocket is inclined to the radial direction of support disc 10 so that the radially outermost region of the pocket is more shallow than the radially innermost region thereof whereby each insert is inclined outwardly so that the radially outer end is farthest away from the support disc.

The incline of the inserts in the support disc in the radial direction will be observed in FIG. 2 which shows an insert 20 at the top of the disc inclined outwardly toward one side and a second insert 20 at the bottom of the disc and inclined outwardly in the opposite direction.

In about the center of the axial length of each pocket, and on the leading side thereof, there is a bore 40 extending through the disc and preferably perpendicular to the axial bottom wall 38 of the respective pocket. Each bore 40 on the side opposite the respective pocket has a counterbore 42 and within the range of the pocket is provided with another counterbore 44.

Each bore 40 is adapted for receiving the shank 46 of a lock pin having an eccentric head 48 receivable in counterbore 44 and having a snap ring retainer 50 at the other end adapted for engaging the bottom of counterbore 42. When an insert is placed in a pocket, rotation of the lock pin referred to will force the insert against the trailing radial wall 34 and the axially inner wall 36 of the respective pocket thereby providing extremely solid and rigid support for the insert.

Figure 7:
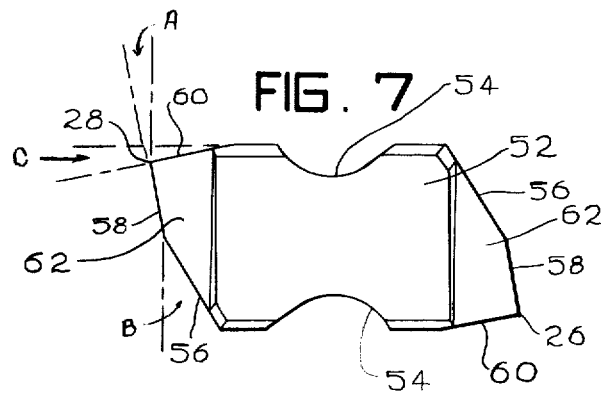
FIG. 7 is a side view of a cutting insert adapted for being received in the pocket of FIG. 4 and looking at the cutting insert from the side which faces the axially bottom wall of the pocket when the insert is mounted therein.
Figure 8:
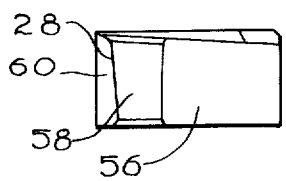
FIG. 8 is an end view looking in at the left end of the insert of FIG. 7.
Figure 9:
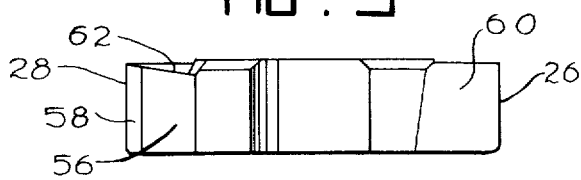
FIG. 9 is a view looking up at the bottom of the insert of FIG. 7.

FIGS. 7 and 8 and 9 each show a typical insert adapted for mounting in a pocket of the support disc 10. The insert 52 in FIG. 7 shows that side which engages the axially bottom wall 38 of the respective pocket. The insert is generally a parallelogram and is provided with transversely extending notches 54 formed in the leading and trailing sides thereof. The recesses or notches 54 are, thus, regions of the insert which are engaged by the eccentric head 48 of the clamp pin above referred to.

Each end of the insert has a first wall portion 56 inclined at angle B to the plane of the adjacent face of the insert and at about the same angle as the radially inner wall 36 of the pocket, and a second wall portion 58 which forms an obtuse angle with the respective portion 56 and is at an angle A to the aforementioned plane.

As mentioned, the insert of FIG. 7 is a negative rake insert and the cutting edges 26 and 28 thereof are formed by the intersection of wall portions 58 at the ends of the insert with wall portions 60 formed on the leading and trailing sides of the insert and making an angle of about 90 to 95 degrees with the adjacent wall portion 58. Wall portions 60 form angles of C with the plane of the adjacent face of the insert.

It has been mentioned that the inserts, when mounted in the pockets, incline outwardly at the radially outer ends and are, also, tilted so that the leading ends are spaced axially outwardly from the trailing ends. The tilting referred to provides the insert with side clearance on the axially outer side while, on the axially inner side of each insert, clearance is formed rearwardly from the cutting edge by the ground off portion 62 which inclines inwardly into the insert from the cutting edge at an angle on the order of about 4°.

Figure 10:
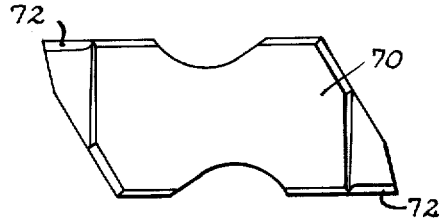
FIG. 10 is a view similar to FIG. 7 but showing a positive rake insert according to the present invention.

FIG. 10 shows an insert 70 substantially identical with the insert of FIGS. 7 to 9 except that the wall portions 72 of the insert of FIG. 10 are disposed at such an angle that when the insert is mounted in the body of the cutter the cutter presents a positive rake angle to the work. In other respects, the insert of FIG. 10 is the same as that of FIGS. 7 to 9.

It has been mentioned that the pockets for receiving the inserts are inclined in a certain direction relative to a radius of the support disc adjacent the respective pocket. However, it will be understood that the inclination of the pockets is not in itself a critical matter, and this circumferential inclination could be changed in order to provide for the desired rake conditions at the cutting edge.

For example, by increasing the forward inclination of the pockets, a greater positive rake angle could be obtained at the cutting edge and by decreasing the inclination a reduced angle could be obtained. Adjustment of the angle of inclination might become important in respect of arriving at an economically manufactured insert configuration.

It will, furthermore, be evident that the lock pins which lock the insert into the pockets could, instead of merely being rotatable in the bores 40 provided therefor, be threaded and engage corresponding threads in the respective bore 40. The locking up action, in this case, would be the same as that as has been disclosed in detail and described above except that the lock pins would have a component of inward travel when rotated into locking position, and this would assist in pressing the locked up insert backwardly against the axially bottom wall of the respective pocket.

It will be evident upon reference to FIGS. 4 and 5 that the thread connecting the thread on the shank of the lock pin and on the respective bore 40 would be a righthand thread.

Modifications may be made within the scope of the appended claims.

What is claimed is:

1. In a slotting cutter; a disc like body having parallel side walls and rotatable in a predetermined direction on a central axis perpendicular to the plane of the body, a plurality of pockets formed into each side wall of the body in circumferentially distributed relation with the pockets in one side of the body staggered relative to the pockets in the other side of the body when the body is viewed in the axial direction, each pocket having circumferentially spaced front and rear walls and an axially bottom wall and a radially inner wall and open on the other two sides, said axially bottom wall converging with the respective side wall of the rotatable disc body in the direction of rotation of said disc body and also inclining outwardly toward said disc wall from the radially inner end of said axially bottom wall toward the outer end thereof, a cutting insert in each pocket having parallel front and back walls and parallel side walls perpendicular to said front and back walls, each insert having an end portion protruding radially from said body and presenting a cutting edge, and clamping means for clamping each insert in the respective pocket while simultaneously urging the insert toward the said rear wall and the said radially inner wall of the pocket.

2. A slotting cutter according to claim 1 in which said clamping means comprises a pin rotatable in said body near the forward wall of each pocket and having an eccentric head thereon engageable with the forwardly facing side of the insert when the pin is rotated.

3. A slotting cutter according to claim 2 in which each insert has a lateral notch formed in the forwardly facing side for engagement by the head of the respective pin whereby the head of the pin generates a force on the insert pressing the insert toward the said rear wall and the said radially inner wall of the respective pocket.

4. A slotting cutter according to claim 1 in which each insert is invertable about an axis substantially parallel to the axis of rotation and has a said cutting edge formed on each end thereof.

5. A slotting cutter according to claim 2 in which said clamping means comprises a screw threaded into said body near the forward wall of each said pocket and having an eccentric head thereon engageable with the forwardly facing side of the insert when the pin is rotated.

6. A slotting cutter according to claim 5 in which each said head tapers inwardly in at least the region thereof which engages the respective said insert, said insert having an inclined recess for engagement by said head whereby said head urges said insert toward said rear wall, said bottom wall and said radially inner wall when said pin is rotated.

7. A slotting cutter according to claim 1 in which the pockets on one side of the wheel axially overlap the pockets in the other side of the wheel.

* * * * *